United States Patent

Tanaka et al.

Patent Number: 5,823,608
Date of Patent: Oct. 20, 1998

[54] DEVICE FOR OPENING VEHICLE WINDOW

[75] Inventors: Tadao Tanaka; Naotsuka Nagai, both of Tokyo, Japan

[73] Assignee: Nippon Pneumatics/Fluidics Systems Co. Ltd., Tokyo, Japan

[21] Appl. No.: 992,074

[22] Filed: Dec. 17, 1997

[30] Foreign Application Priority Data

Dec. 19, 1996 [JP] Japan .................................. 8-359293
Jan. 20, 1997 [JP] Japan .................................. 9-021089

[51] Int. Cl.⁶ .......................................................... B60J 1/17
[52] U.S. Cl. ............................................. 296/146.2; 49/141
[58] Field of Search ............................. 296/146.2; 49/141

[56] References Cited

FOREIGN PATENT DOCUMENTS

403295719 A 12/1991 Japan ................................. 296/146.2
2242929 10/1991 United Kingdom ................ 296/146.2

*Primary Examiner*—Gary C. Hoge
*Attorney, Agent, or Firm*—Steinberg & Raskin, P.C.

[57] ABSTRACT

There is disclosed a vehicle window-opening device for quickly opening a vehicle window manually or automatically. If the vehicle should fall into a sea or river, the window-opening device prevents the passengers from being confined within the vehicle. If the vehicle is fitted with an air bag system, any secondary accident can be prevented. More specifically, there is provided a device for opening a window mounted in a door of a vehicle having a window-driving mechanism for causing the window to slide up or down, the device comprising a gas source, a gas-ejecting mechanism for ejecting the gas of the gas source manually or automatically, and an actuator actuated by an ejected gas from the gas-ejecting mechanism. Wherein a driving force of the actuator is transmitted to the window-driving mechanism, thus driving the window open.

4 Claims, 5 Drawing Sheets

DEVICE FOR OPENING VEHICLE WINDOW

BACKGROUND OF THE INVENTION

1. Field of the Invention

The present invention relates to a device for opening a vehicle window.

2. Description of the Prior Art

A vehicle door has a window comprising a pane of glass. The window is driven open or closed either by manually rotating a regulator handle or by driving the window, using an electric motor.

However, both methods are essentially identical in structure. Rotating force from the regulator handle or from the electric motor is transmitted to a window-driving mechanism, which in turn transforms the rotating force into a vertical force via an X-shaped arm (not shown) or the like to cause the window to slide up or down.

If the vehicle should become involved in a collision, the windows may be locked, thus confining the passengers within the vehicle. However, because of the above-described structure of the window-driving mechanism, the window cannot be driven from outside the vehicle. Therefore, if all the windows should be locked, then rescue operation would be hindered.

Indeed, it happened that vehicles fell into seas or rivers and the doors became locked by hydraulic pressure, thus confining the passengers. It may be considered to open the window so that the passenger can escape. With the manual system, the regulator handle must be rotated, which is laborious to perform. With the electric window, water intrudes into the door, causing electric short and other troubles. In consequence, the window cannot be driven open.

In recent years, increasing number of vehicles are equipped with air bag systems for the driver's seat and for the front passenger seat. An air bag system is next described briefly by referring to FIG. 6. The air bag system comprises an impact sensor 101, an air bag 102, and a gas-generating portion 103 for producing a gas when the impact sensor 101 senses an impact. Normally, the air bag 102 is folded and received in position.

In an accident, a large impact acts on the vehicle, which is sensed by the impact sensor 101. This sensor supplies an electrical current to the gas-generating portion 103. Then, a solid gas-generating material such as sodium nitride in the gas-generating portion 103 is ignited and burns, producing a gas. This inflates the air bag 102.

The inflation of the air bag 102 pushes aside a corresponding amount of air inside the vehicle. Therefore, if the interior is hermetically closed, the pressure inside the vehicle rises, thus sometimes causing secondary accidents such as rupture of the passenger's eardrum.

Inert gases are mainly used as the gas supplied into the air bag 102. Therefore, where the interior is hermetically closed, if the gas leaks from the air bag, the gas fills in the interior. As a result, a deficiency of oxygen may be brought about.

SUMMARY OF THE INVENTION

It is an object of the present invention to provide a vehicle window-opening device that is free of the foregoing problems (i.e., designed to quickly drive the window open either manually or automatically).

The present invention provides a device for opening a window mounted in a door of a vehicle having a window-driving mechanism for causing the window to slide up or down, the device comprising a gas source, a gas-ejecting mechanism for ejecting the gas of the gas source manually or automatically, and an actuator actuated by the ejected gas from the gas-ejecting mechanism, wherein a driving force of the actuator is transmitted to the vehicle window-driving mechanism, thus driving the window open.

In one feature of the invention, the above-described window-driving mechanism transforms a rotating force into a vertical force to cause the window to slide up or down, and the actuator comprises a rotating member that undergoes the ejected gas and is rotated thereby, the rotating member producing a rotating force transmitted to the window-driving mechanism, thus driving the window open.

In another feature of the invention, there is provided an impact sensor and when the impact sensor senses an impact, the gas of the gas source is automatically ejected from the gas-ejecting mechanism.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
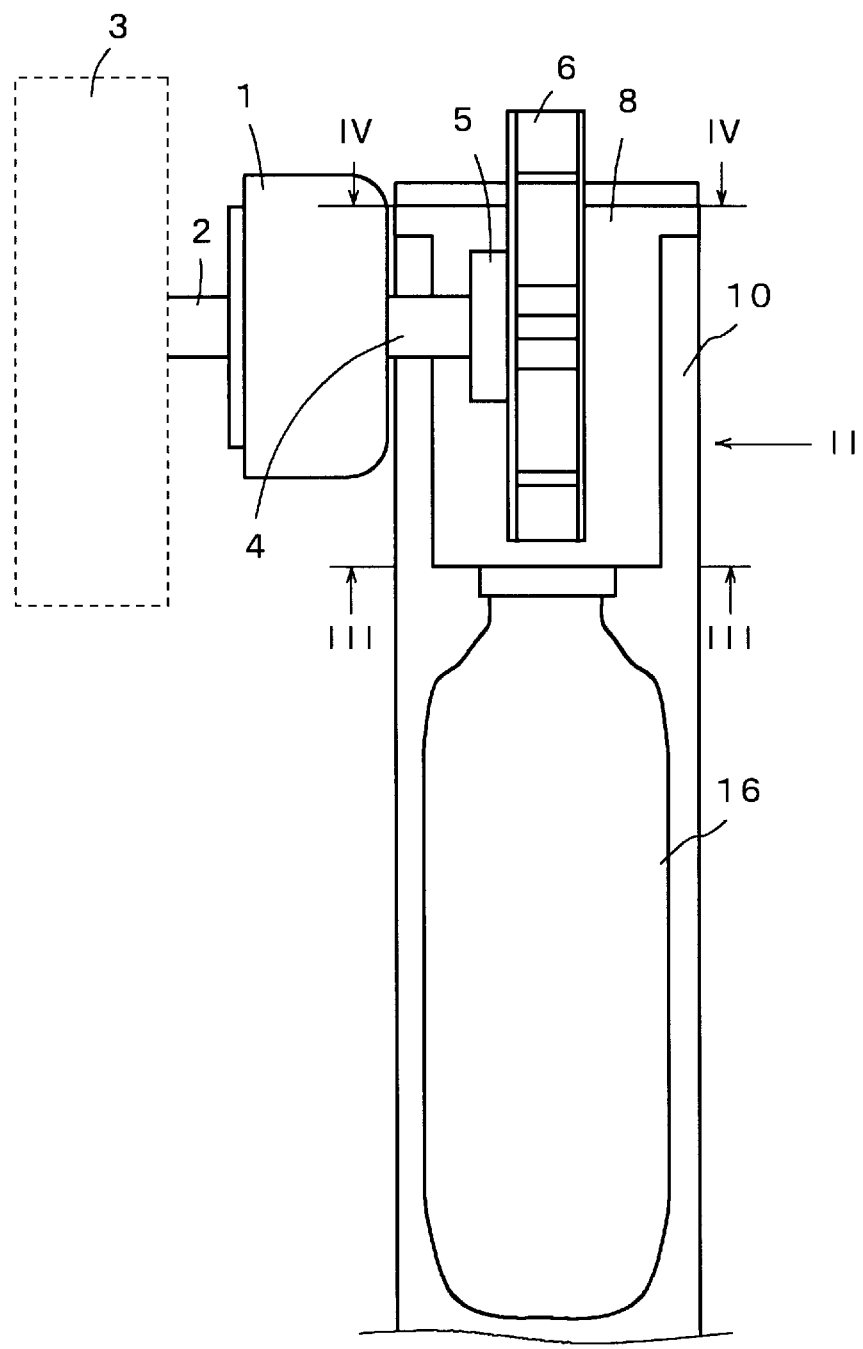
FIG. 1 is a side elevation of a vehicle window-opening device in accordance with the present invention.

Referring to FIGS. 1–4, there is shown a vehicle window-opening device embodying the concept of the present invention. An electric motor 1 for an electric window is installed in a vehicle door, as shown in FIG. 1. The motor 1 has an output shaft 2, which protrudes from one end of the motor and is linked to a window-driving mechanism 3 of the same construction as the aforementioned window-driving mechanism.

An auxiliary shaft 4 protrudes from the other end of the motor 1 and is linked to the output shaft 2. This auxiliary shaft 4 is connected to a rotating member 6 via a coupling 5. Accordingly, when the rotating member 6 rotates, the output shaft 2 of the motor 1 can be rotated via the coupling 5 and via the auxiliary shaft 4. If the rotating force is transmitted to the window-driving mechanism 3, the window can be made to slide up or down, depending on the direction of the rotation.

Figure 2:
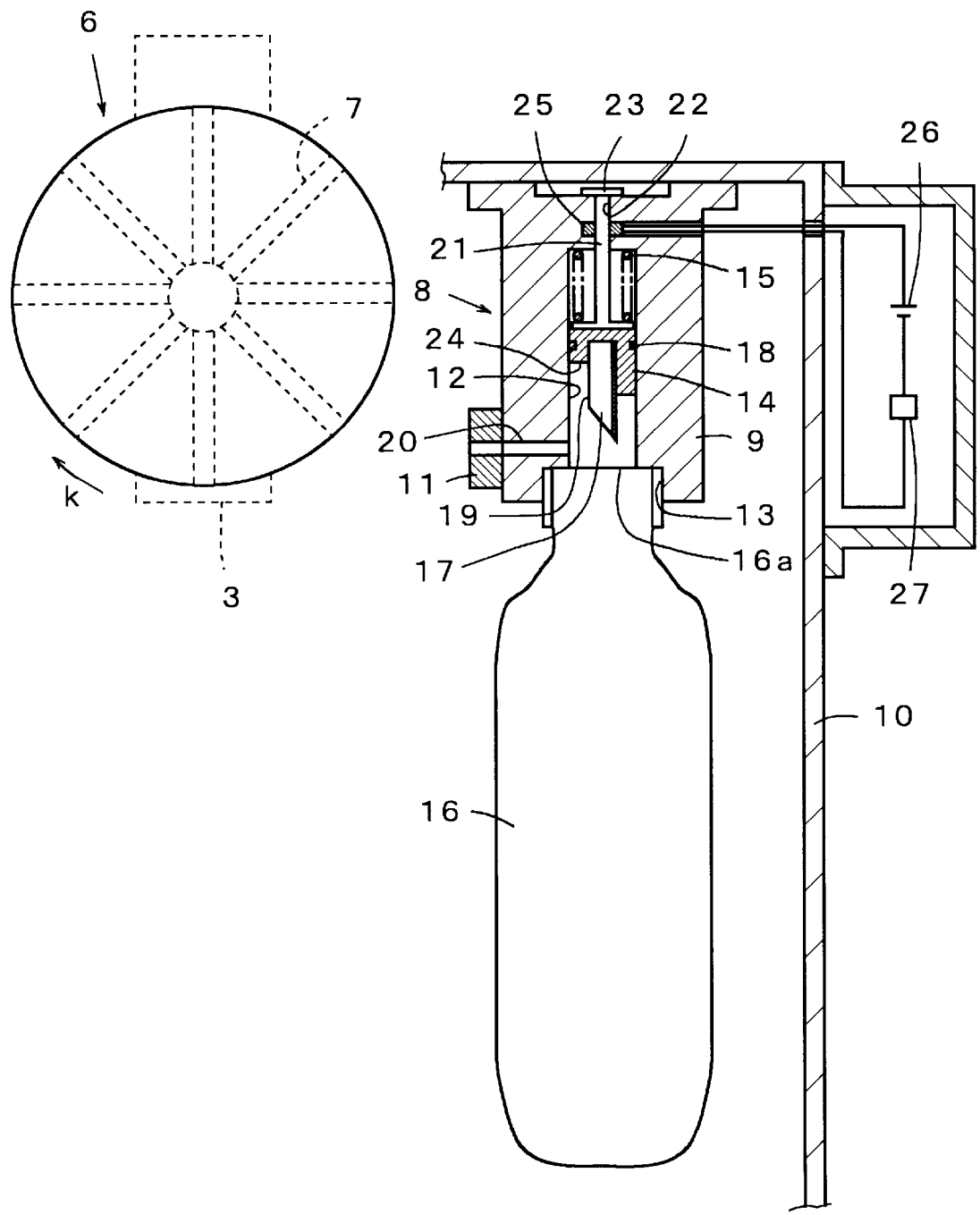
FIG. 2 is a side elevation partially in cross section taken along line II—II of FIG. 1.

As shown in FIGS. 1 and 2, the rotating member 6 consists of two disks opposite to each other. A plurality of moving blades 7 extending radially from the center of rotation are mounted between these two disks. The blades 7 are substantially uniformly spaced from each other circumferentially.

A gas-ejecting mechanism 8 comprises a body 9 supported by a frame 10 and is located adjacent to the rotating member 6. A gas-ejecting nozzle 11 is mounted to the body 9 and positioned opposite to any one of the blades 7 of the rotating member 6.

Accordingly, when a gas is discharged from the gas-ejecting nozzle 11, the moving blades 7 undergo the gas and thus the rotating member 6 is rotated. Thus, the plural blades 7 undergo the gas in turn. Therefore, the rotating member 6 continues to rotate in the direction indicated by the arrow k. This direction dictates the direction in which the window is caused to slide downward, i.e., the direction in which the window is driven open.

The body 9 is provided with a sliding hole 12 whose lower end is continuous with a gas container-receiving hole 13 that is opened to atmosphere. A movable member 14 is slidably mounted in the sliding hole 12, and an O-ring is mounted around the movable member 14. The resilient force of a spring 15 acts on the movable member 14 toward the gas container-receiving hole 13.

A small-sized, high-pressure gas container 16 is threaded in the gas container-receiving hole 13 and has a delivery port 16a located in this hole 13. The delivery port 16a is closed off by a metal foil. A cylindrical pin 17 having a needlelike front-end portion is mounted to the bottom end of the movable member 14. When the spring 15 assumes its natural length, the front-end portion of the pin 17 breaks through the metal foil of the high-pressure gas container 16.

Figure 3:
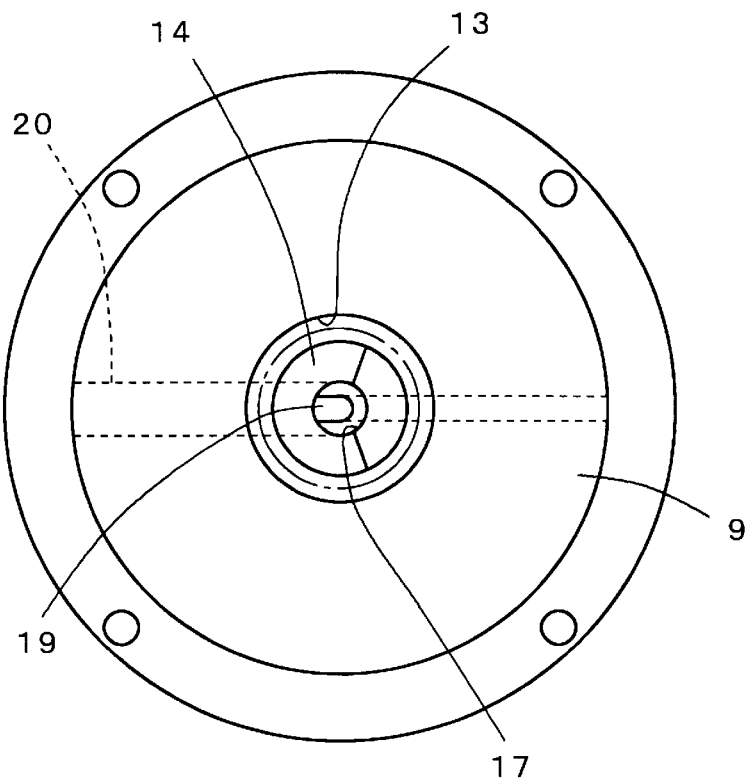
FIG. 3 is a cross-sectional view taken along line III—III of FIG. 1.

As shown in FIG. 3, this cylindrical pin 17 is not a perfect cylinder but is provided with a cutout 19 at one side. When the front-end portion of the cylindrical pin 17 breaks through the metal foil and enters the delivery port 16a, a gas discharge passage is formed by the interior of the pin 17, the cutout 19, and an entrance passage 20. A step portion 24 is formed on the movable member 14 on the side of the cutout 19. Accordingly, when the front-end portion of the pin 17 breaks through the metal foil, this cutout 19 is not closed off.

A rod member 21 is fixedly mounted to the top end of the movable member 14. A hole 22 extends through the body 9. The rod member 21 is inserted in the hole 22 and protrudes upwardly from the top end of the body 9.

Under this condition, a stopper 23 mounted at an end of the rod member 21 is caught at the top end of the body 9. The spring 15 is tightened, applying an initial load to the spring.

Figure 4:
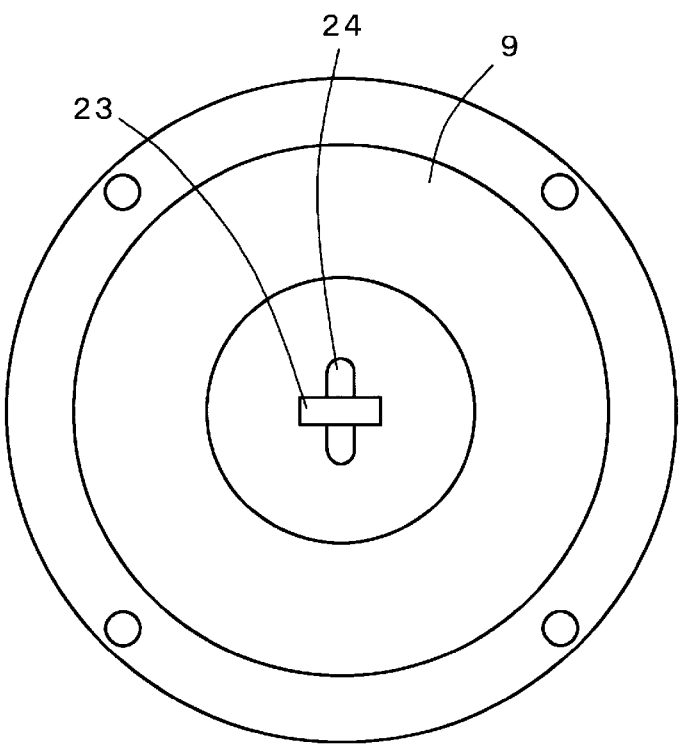
FIG. 4 is a cross-sectional view taken along line IV—IV of FIG. 1.

In this embodiment, the hole 22 extending through the body is a slot as shown in FIG. 4. The stopper 23 takes the form of a rod. The rod member 21 and the stopper 23 are combined to form a T-shaped subassembly, which allows the rod member 21 to pass into the hole 22 from the side of the sliding hole 12 in the rod member 21 along the contour of the slot. While the stopper 23 protrudes upwardly from the top end of the body 9, the rod member 21 is rotated through 90 degrees. Thus, the stopper 23 is caught at the top end of the body 9.

The rod member 21 is molded out of a fusible metal (such as Pb, Se, and Sn) that is a fusible alloy melted at a certain temperature. A heater 25 is mounted in the hole 22 around the rod member 21, as shown in FIG. 2. The heater 25 is connected with dry batteries 26 forming a power supply and with an impact sensor 27 for sensing an impact. When the sensor 27 senses an impact, the heater 25 is electrically energized. Of course, the power supply and impact sensor used for an air bag system installed in the vehicle may also be used as the power supply 26 and the impact sensor 27 so that they may interlock with the air bag system.

The operation of this window-opening device is described now. When the impact sensor 27 senses an impact, the heater 25 is electrically energized. The heater 25 generates heat, thus melting and breaking the rod member 21. Then, the initial load of the spring 15 moves the movable member 14 toward the gas container-receiving hole 13. The front-end portion of the cylindrical pin 17 mounted on the movable member 13 breaks through the metal seal of the small-sized, high-pressure gas container 16 and enters the delivery port 16a. Therefore, the gas from the container 16 passes through the delivery port 16a, the interior of the cylindrical pin 17, the cutout 19, and the entrance passage 20 in this order. The gas is then forced into the gas-ejecting nozzle 11 and ejected toward the moving blades 7 of the rotating member 6.

As described previously, the moving blades 7 of the rotating member 6 undergo the gas and rotate, thus rotating the output shaft 2 of the electric motor 1. The rotating force is transmitted to the window-driving mechanism 3, thus driving the window open.

The coupling 5 for coupling together the rotating member 6 and the auxiliary shaft 4 may be so designed that it does transmit the rotation from the rotating member 6 but does not transmit the rotation from the auxiliary shaft 4. In this structure, the window can be normally driven by the motor 1 without being hindered by the rotating member 6.

Alternatively, the coupling 5 may be designed so that, when the rotating force transmitted from the rotating member 6 to the auxiliary shaft 4 reaches a given magnitude, the coupling no longer permits the transmission. In this structure, if the rotating member 6 is rotated while the window is fully open, the auxiliary shaft 4 cannot rotate, applying a large load to the rotating member 6. When this load reaches a given level, the coupling 5 disconnects the auxiliary shaft 4 from the rotating member 6. Consequently, application of an excessive force to the window-driving mechanism 3 is prevented, otherwise it would break down.

In the embodiment described thus far, if a collision or accident occurs, or if the vehicle falls into a sea or river along with the passengers, the impact sensor 27 senses the impact and opens the window automatically and quickly. Accordingly, after the accident, the passengers confined in the vehicle can be rapidly rescued. In addition, if the vehicle falls into a sea or river, the passengers will be able to escape for themselves.

If the window-opening device in accordance with the present invention is used in a vehicle fitted with an air bag system, the window can be opened simultaneously with inflation of the air bag 102 caused by an impact. This prevents increases in the pressure inside the vehicle. Hence, any secondary accident such as rupture of the passenger s eardrum can be avoided. In addition, if the gas leaks from the air bag 102, the gas will not fill in the interior of the vehicle and thus a deficiency of oxygen will not occur.

In this embodiment, the impact sensor 27 is provided to automatically drive the window open. Instead of the impact sensor 27, a switch may be provided to permit one to manually turn on the heater 25.

Figure 5:
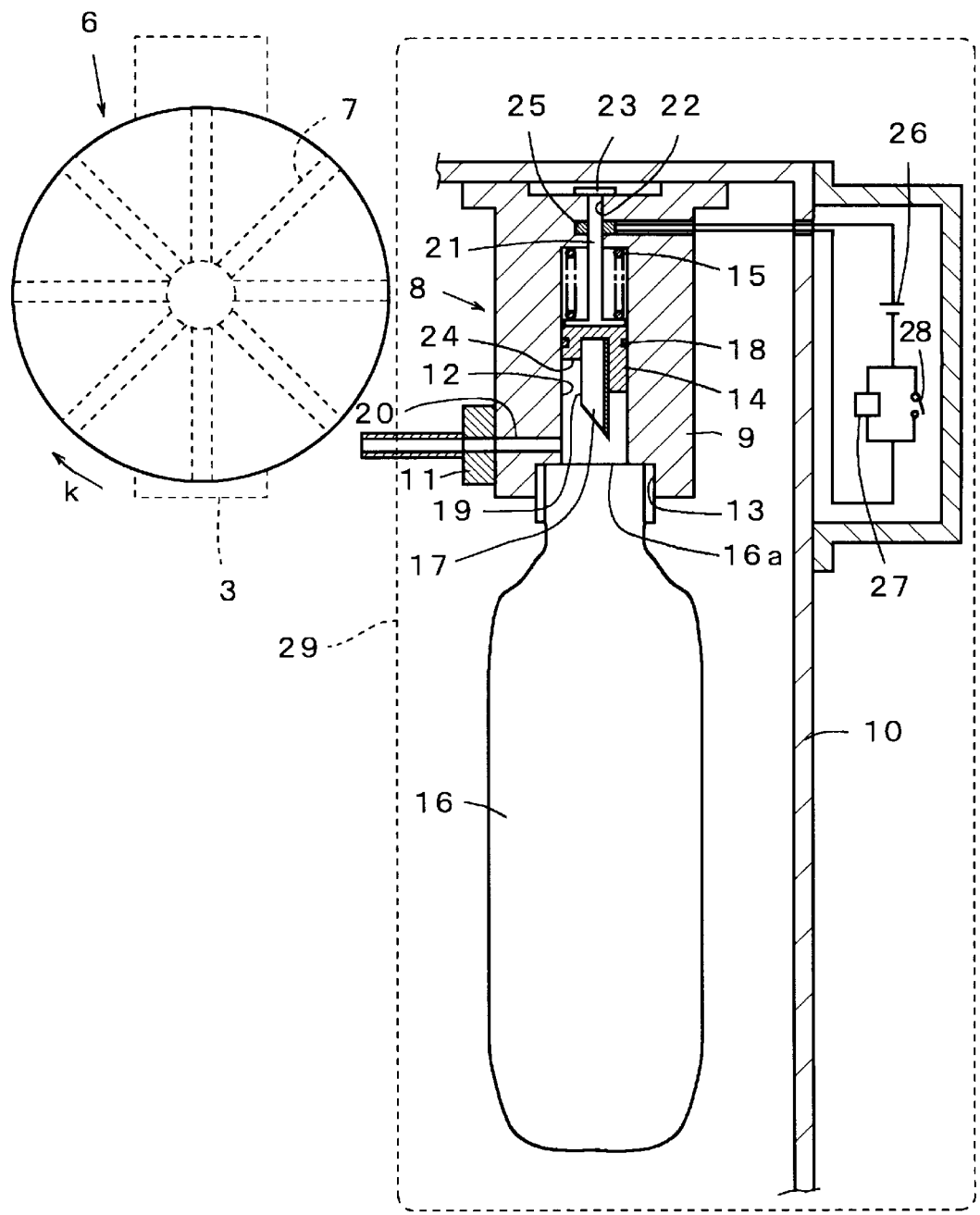
FIG. 5 is a view similar to FIG. 2, but in which an impact sensor 27 is connected in parallel with a switch 28.
Figure 6:
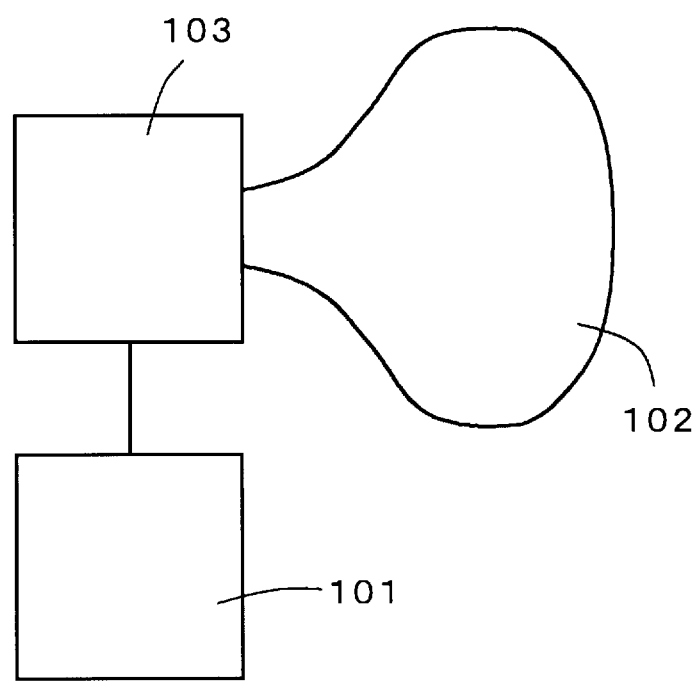
FIG. 6 is a schematic representation of an air bag system installed in a vehicle in which a vehicle window-opening device in accordance with the invention can be used.

Alternatively, by connecting the impact sensor 27 and a switch 28 in parallel as shown in FIG. 5, the window can be quickly opened manually if any impact large enough to be sensed by the impact sensor 27 is not produced when the vehicle falls into a sea or river. In this case, since it is only necessary to turn on the switch 28, the labor to rotate the window regulator handle is dispensed with.

Where the gas-ejecting mechanism 8, the dry batteries 26 forming the power supply, the impact sensor 27, the switch 28, and other components are encased in a waterproof casing 29 as shown in FIG. 5, these components can be effectively protected if the vehicle should fall into a sea or river. Even in water, the rotating member 6 can be rotated by the pressure of the ejected gas. However, greater advantages are obtained by placing the gas-ejecting nozzle 11 close to the moving blades 7 of the rotating member 6, using pipes, as shown in FIG. 5.

If it is not desirable to use an electrical circuit employing a power supply as a manual gas-ejecting mechanism, the gas-ejecting mechanism 8 may be actuated by a mechanical structure. More specifically, a pin (not shown) maintains application of the initial load of the spring 15 to the cylindrical pin 17. When the pin is pulled out, the cylindrical pin 17 breaks through the metal foil of the small-sized, high-pressure gas container 16.

In this embodiment, the rotating member 6 is used as an actuator. Instead, a piston or a cylinder incorporating a piston may be used. This piston is linked not to the electric motor 1 of the window-driving mechanism but to the portion that applies a vertical force to the window. When a gas is ejected from the gas-ejecting mechanism 8, the gas is directed into any desired pressure chamber inside the cylinder. The pressure of this gas causes the piston to slide the window downward, i.e., to drive it open.

In addition, in the present embodiment, the small-sized, high-pressure gas container 16 is used as a gas source. Any other gas source may be employed. Furthermore, modifications may be made to the gas-ejecting mechanism 8 according to the gas source. For example, where a gas-generating material is used as the gas source, the gas-generating mechanism 8 may be designed so that it ignites the gas-generating material to produce a gas directed toward the moving blades 7 of the rotating member 6.

While a vehicle door incorporating an electric window has been described, the invention can be similarly applied to a structure having a window regulator handle rotated manually. That is, in this manually driven structure, the window is driven open or closed by a rotating force in the same way as the foregoing. If the rotating member 6 produces this rotating force, the window can be automatically opened.

In accordance with the present invention, a vehicle window can be quickly opened simply by ejecting a gas manually or automatically. Where an impact sensor is fitted and the window is automatically opened on sensing an impact, if a collision or other accident takes place, and if the passengers are confined within the vehicle, they can be quickly rescued. In addition, if the vehicle falls into a sea or river, the passengers will be able to escape for themselves. Where the window-opening device in accordance with the present invention is used in a vehicle fitted with an air bag system, the window can be opened simultaneously with inflation of the air bag induced by an impact. This prevents increases in the pressure inside the vehicle. Hence, any secondary accident such as rupture of the passenger's eardrum can be avoided. Additionally, if the gas leaks from the air bag, the gas will not fill in the interior of the vehicle and thus a deficiency of oxygen will not occur.

What is claimed is:

1. A device for opening a window mounted in a door of a vehicle having a window-driving mechanism for causing said window to slide up or down, said device comprising:
   a gas source;
   a gas-ejecting mechanism for ejecting the gas of said gas source manually or automatically; and
   an actuator actuated by an ejected gas from said gas-ejecting mechanism; wherein
   a driving force of said actuator is transmitted to said window-driving mechanism, thus driving said window open.

2. The device of claim 1, wherein said window-driving mechanism transforms a rotating force into a vertical force to cause said window to slide up or down, and wherein said actuator comprises a rotating member that undergoes said ejected gas and is rotated thereby, said rotating member producing a rotating force transmitted to said window-driving mechanism, thus driving said window open.

3. The device of claim 1, wherein there is provided an impact sensor, and wherein when said impact sensor senses an impact, the gas of said gas source is automatically ejected from said gas-ejecting mechanism.

4. The device of claim 2, further comprising an impact sensor for sensing an impact structured and arranged such that when said impact sensor senses an impact, the gas of said gas source is automatically ejected from said gas-ejecting mechanism.

* * * * *